A. J. MARKHAM.
CORN HARVESTER.
APPLICATION FILED MAR. 3, 1913.
1,121,740.
Patented Dec. 22, 1914.
4 SHEETS—SHEET 4.
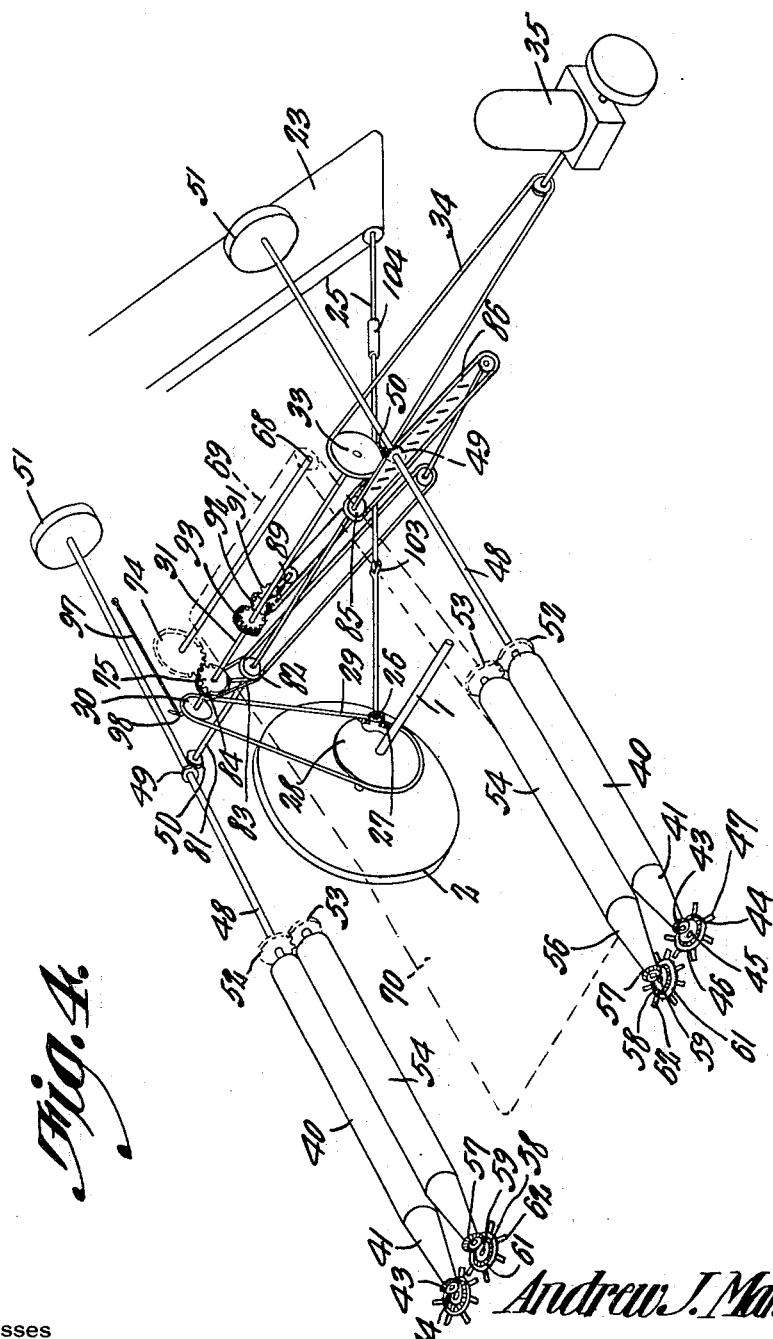
Fig. 4.
Witnesses
Andrew J. Markham
Inventor
by C. A. Snow & Co.
Attorneys

UNITED STATES PATENT OFFICE.

ANDREW J. MARKHAM, OF DANA, IOWA, ASSIGNOR OF ONE-TENTH TO CHARLES A. SWANSON, ONE-TENTH TO CHARLES A. SENTER, ONE-TENTH TO EDGAR J. CLARK, ONE-TENTH TO GEORGE W. MORRIS, AND ONE-TENTH TO WILLIAM C. JOHNSTON, ALL OF DANA, IOWA.

CORN-HARVESTER.

1,121,740.  Specification of Letters Patent.  Patented Dec. 22, 1914.

Application filed March 3, 1913. Serial No. 751,898.

*To all whom it may concern:*

Be it known that I, ANDREW J. MARKHAM, a citizen of the United States, residing at Dana, in the county of Greene and State of Iowa, have invented a new and useful Corn-Harvester, of which the following is a specification.

This invention relates to corn harvesting machines, one of its objects being to provide a machine of this character designed to harvest corn from two rows simultaneously.

A further object is to provide improved means whereby the corn harvesting mechanism and the parts coöperating therewith can be adjusted angularly so as to raise and lower the front end of the machine and thus adapt said machine to act upon corn of different heights from the ground.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
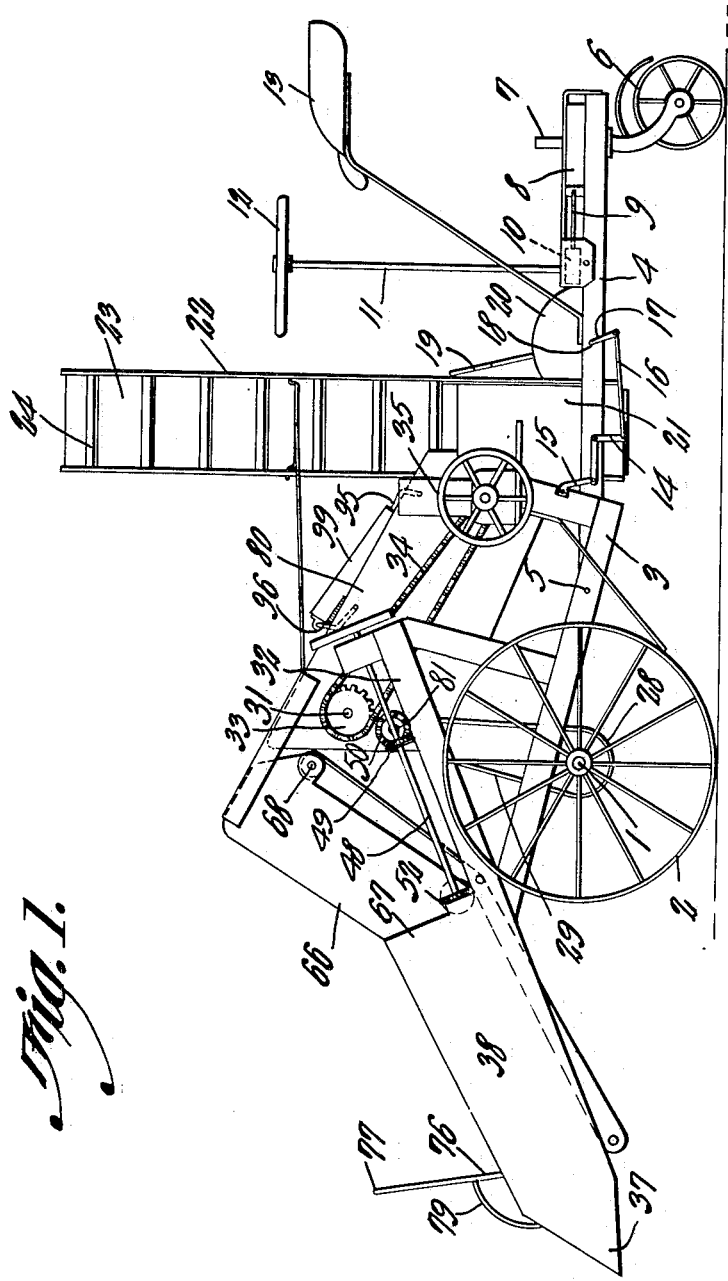
Figure 2:
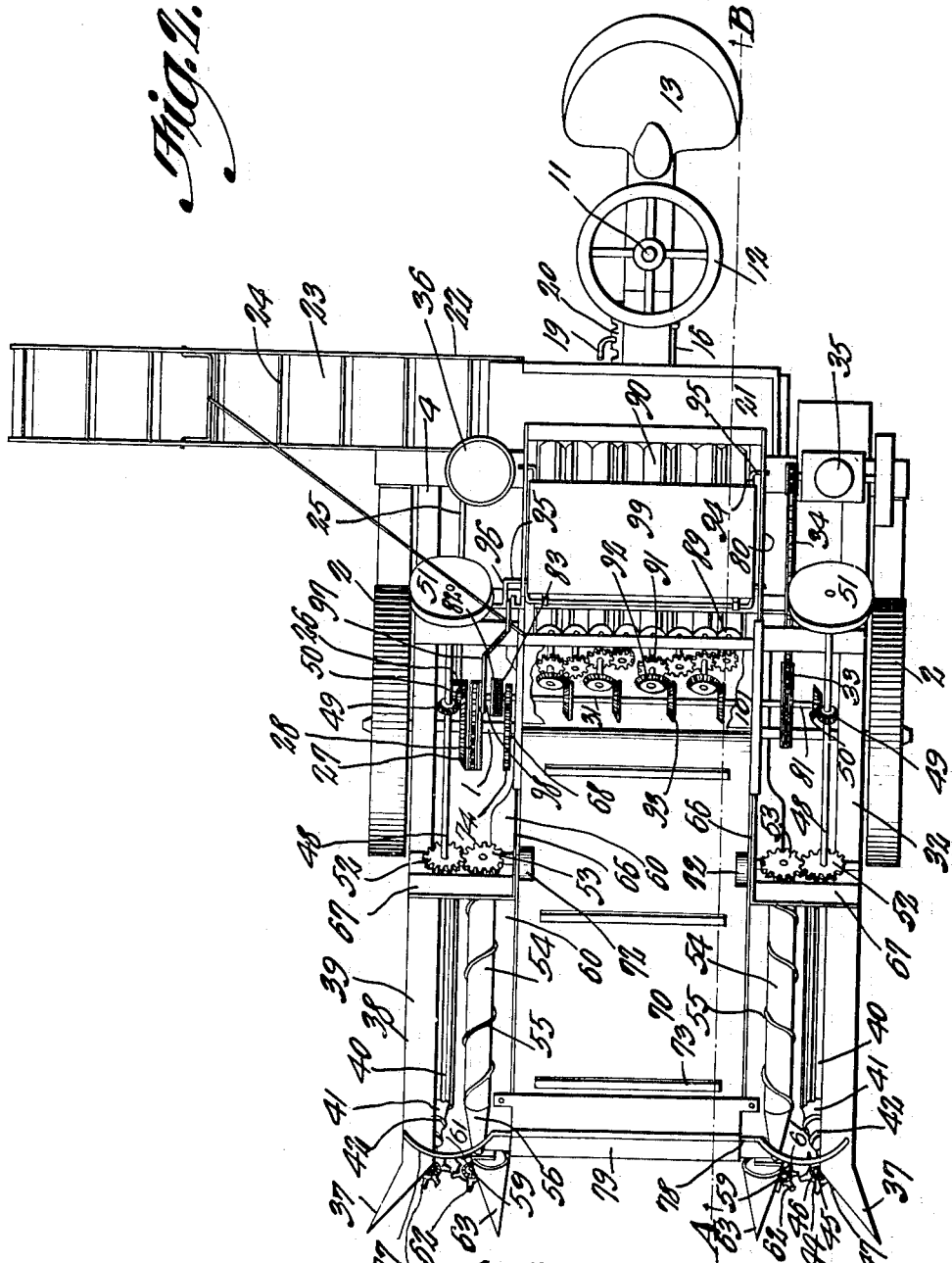
Figure 3:
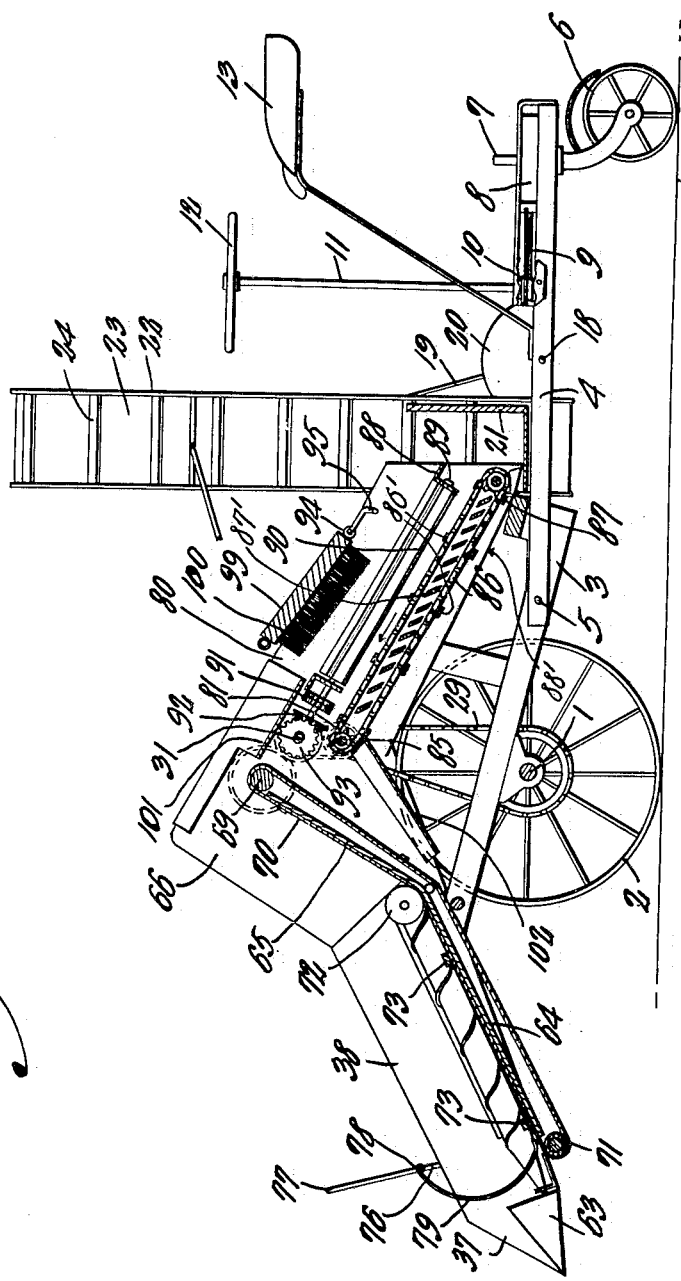

In said drawings:—Figure 1 is a side elevation of the machine. Fig. 2 is a plan view. Fig. 3 is a longitudinal section on line A—B, Fig. 2. Fig. 4 is a view showing diagrammatically the driving mechanism utilized in connection with the various parts of the machine.

Referring to the figures by characters of reference 1 designates the revoluble axle supported by wheels 2 which are adapted to rotate therewith. A frame 3 is supported by and tiltably mounted on the axle and extending into the rear portion of the frame 3 is a rear frame 4 pivotally connected, as at 5, to the sides of the tiltable frame 3. The rear end portion of the rear frame 4 has a steering wheel 6 provided with a post 7 mounted for rotation in the frame 4. A head 8 rotates with the post 7 and opposed portions of the head are connected, by chains 9 or other flexible elements, to a wheel 10 secured to the lower end portion of a steering post 11 the upper end of which is provided with a hand wheel 12 or the like. Thus it will be seen that by rotating the post 11 the steering wheel 6 can be swung in either direction so as to guide the machine. The seat 13 to be occupied by the operator is supported by the rear frame 4.

A bell crank lever 14 is connected to the frame 4 and one arm of this lever is connected to the rear portion of the tiltable frame 3 by a link 15. The other arm of the lever is connected by a bar 16 to a crank arm 17 arranged upon a transverse shaft 18. A lever 19 extends from this shaft and it will be apparent that by shifting this lever, shaft 18 will be rotated and the tiltable frame 3 thus swung upwardly or downwardly relative to the rear frame 4. Thus it will be seen that the front end of the machine can be raised or lowered as desired. A toothed segment 20 is mounted on the frame 4 and coöperates with lever 19 to hold the shaft 18 against rotation.

Arranged transversely upon the rear frame 4 close to the back end of the tiltable frame 3 is a trough 21 having an outlet adjacent one end of the machine, the bottom of the trough being inclined downwardly toward said outlet.

An inclined elevator casing 22 extends upwardly and laterally from the machine at the discharge end of the trough 21 and in this casing is arranged an endless elevator belt 23 preferably provided with cross cleats 24. The lower portion of the conveyer belt is mounted on a shaft 25 which extends forwardly and is provided at its front end with a gear 26 constantly meshing with a gear 27 secured to the axle 1. This gear is also provided with peripheral sprocket teeth 28 engaging a drive chain 29, this chain receiving motion from a sprocket 30 secured to a transverse shaft 31. Inclined beams 32 are fixedly connected to the front end of the frame 3 and are extended downwardly and forwardly therefrom. A sprocket 33 is secured to shaft 31 and receives motion, through a chain 34, from a motor 35 mounted on one side of the frame 3 adjacent the back thereof. A water tank 36 is mounted on said frame adjacent the other side so as to counter balance the motor.

The downwardly and forwardly extending side beams 32 are provided, at their front ends, with substantially conical dividers 37 which, as shown in Fig. 2, are turned laterally. These dividers are preferably made integral with guard plates 38 upstanding from and extending longitudinally of the side beams and having inwardly extended flanges 39 which overhang longitudinally corrugated snapping rolls 40. Each of these snapping rolls has a conical front end 41 formed with a spiral groove 42 and a bevel gear 43 is secured to the front end of said conical portion and meshes with a bevel gear 44 secured to a short vertical shaft 45 journaled upon the front portion of the beam 32. Shaft 45 has a disk 46 secured to it and from the periphery of this disk extend gathering fingers 47. The snapping roll 40 is secured to a longitudinal shaft 48 journaled upon the beam 32 and provided with a bevel gear 49 which meshes with another bevel gear 50 secured to a shaft 81. A fly wheel 51 may be secured to the shaft 48. A gear 52 is secured to shaft 48 close to the snapping roll 40 and meshes with another gear 53 secured to the upper end portion of a snapping roll 54 which is parallel with the roll 40 but, instead of being provided with longitudinal grooves, has a spiral rib 55 as shown in Fig. 2. The front end of this snapping roll 54 is conical as shown at 56 and has a gear 57 meshing with another gear 58 secured to a vertical shaft 59, the vertical shaft being journaled at the front end of a beam 60 which is disposed parallel to the beams 32. A disk 61 is secured to shaft 59 and has gathering fingers 62 extending from its periphery, these fingers corresponding with the fingers 47. The beams 60 adjacent the two sides of the machine are both interposed between the beams 32 and the front ends of these beams 60 have substantially conical dividers 63 inclined downwardly and forwardly and preferably extended slightly inwardly toward the longitudinal center of the machine so that the dividers 37 and 63 will thus diverge forwardly.

A platform 64 is supported at its sides by the beams 60 and this platform has an upwardly extending rear portion 65 from the sides of which extend upstanding walls 66 which merge at their forward ends into laterally extending walls 67 extending to the sides of the machine and up to the plates 38. A transverse shaft 68 is journaled in the upper end portions of the walls 66 and carries a roller 69 engaged by an endless conveyer apron 70. This apron is inclined downwardly and forwardly along the upper surface of the platform 64 and engages a transverse roller 71 arranged close to the front end portion of the platform. Guide rollers 72 are arranged above the sides of the platform at the angle formed at the lower end of the upwardly inclined portion 65 so that the upper flight of the apron is thus held close to the platform at all times. This apron may be provided with transverse cleats 73 for engaging the corn and carrying it upwardly. Shaft 68 receives its motion through a gear 74 meshing with another gear 75 secured to the shaft 31.

Posts 76 extend upwardly from the front end portions of the beams 32 and merge into arches 77 which bridge the throats formed between the converging dividers 37 and 63, these arches being connected by a cross bar 78. This bar is engaged by the upper end of a retaining plate 79, the lower portion of the plate being fastened on the front ends of the beams 60 and above the front end portion of the apron 70. This guard plate 79 is preferably bowed as shown particularly in Fig. 3.

Supported by the frame 3 back of the beams 32 are downwardly and rearwardly inclined side walls 80 in which is journaled a shaft 81 having a sprocket 82 which receives motion, through a chain 83, from another sprocket 84 secured to the shaft 31. This shaft 81 has sprockets 85 engaged by endless chains 86 connected by slats 86' to form a conveyer. This conveyer is inclined downwardly and rearwardly and is mounted upon sprockets 87 arranged between the lower end portions of the side walls 80. An inclined riffle 87' is located under the top of the conveyer and an inclined board 88' is located under the conveyer for directing loose corn into the trough 21. Transverse beams 88 connect the side walls 80 near the upper and lower ends thereof and journaled in these beams are shafts 89 carrying husking rolls 90. The upper end portions of the shafts 89 have gears 91 which mesh with each other, it being understood that the shafts 89 are arranged in pairs and that the gears of each pair mesh so that the shafts of each pair will rotate in opposite directions. One shaft of each pair has a bevel gear 92 at its upper end, this gear meshing with another gear 93 secured to the shaft 31. Shafts 94 extend across the space between the side walls 80 and have cranks 95 which are journaled in the side walls 80. An arm 96 extends downwardly from one of these cranks 95 and is connected, by a pitman 97, to a crank arm 98 arranged at one end of the shaft 31. The shafts 94 are secured to the end portions of a block 99 carrying brush bristles 100, this block and its bristles being adapted to work up and down within the space between the walls 80 when the crank arms are swung back and forth by the pitman 97 and the crank arm 98.

It will be apparent that when the motor is in operation and driving the mechanism of the machine, the said machine will be propelled forward, motion being transmitted to the axle 1 and the wheels 2 by chain 29, this chain receiving motion from sprocket 30 secured to shaft 31 which, as hereinbefore explained, is driven by the motor through chain 34. At the same time motion is transmitted through chain 83 to shaft 81 and the gears 50 thus drive gears 49 and cause the shafts 48 to rotate. Motion is transmitted from shafts 48 to the snapping rolls 54 through gears 52 and 53 and the snapping rolls of the two pairs are thus caused to rotate in opposite directions, these snapping rolls at the same time rotating the disks 46 and 61 so that the gathering fingers 47 and 62 will engage the stalks and draw them between the conical ends 41 and 56. The snapping rolls will remove the ears from the stalks and said ears will be directed onto the apron 70. This apron is operated continuously through gears 75 and 74 and shaft 68 and the ears, when deposited on the apron will be carried upwardly and drop onto an apron 101 along which they will gravitate onto the upper ends of the husking rolls 90. These rolls, as hereinbefore stated, are arranged in pairs, the rolls of each pair rotating in opposite directions and said rolls receiving motion through the gears 93, 92 and 91. As the ears pass downwardly along the inclined husking rolls 90, the block 99 and bristles 100 are moved downwardly and upwardly so as to press the ears against the husking rolls thus forcing the husks positively into engagement with the rolls. Thus the husking of the ears is insured and the husks will drop onto the riffle 87' which is located under the rolls 90 and will be conveyed by chains 86 and slats 86' upwardly to the upper end of a discharge chute 102 arranged under the apron 70. The ears, after being acted on by the husking rolls, will drop into the trough 21 and slide along the inclined bottom thereof to the lower end of the elevator casing 22 where they will be engaged on the cleats on the apron 23 and raised to the upper end of the casing from which point they will be discharged into a wagon or other receptacle at the side of the machine.

It will be apparent that, by manipulating lever 19, the frame 3 can be tilted on the axle 1 so as to raise or lower the front end of the machine. Inasmuch as the frames 3 and 4 are pivotally connected back of the axle 1, it will of course be necessary to make the shaft 25 telescopic and also to provide it with a universal joint. This universal joint has been indicated at 103 and the slidably connected portions of the shaft have been indicated at 104 in Fig. 4.

By providing the guard plate 79 at the front end of the platform 64, the ears, when deposited onto the lower portion of the apron 70, will be prevented from sliding forwardly out of the machine.

What is claimed is:—

In a machine of the class described, the combination of snapping rolls arranged in pairs and having forwardly diverging conical front ends, of a substantially vertical shaft adjacent the front end of each roll, gathering fingers revoluble with each shaft in a substantially horizontal plane for directing standing stalks laterally into the space between the conical ends, and meshing gears upon the snapping rolls and vertical shafts for transmitting motion from said rolls to the shafts, and dividers diverging forwardly, said dividers being located in front of the snapping rolls, the gathering fingers being extended into the space between the dividers.

In testimony that I claim the foregoing as my own, I have hereto affixed my signature in the presence of two witnesses.

ANDREW J. MARKHAM.

Witnesses:
  G. E. MEREDITH,
  C. A. SWANSON.